Patented Apr. 12, 1932

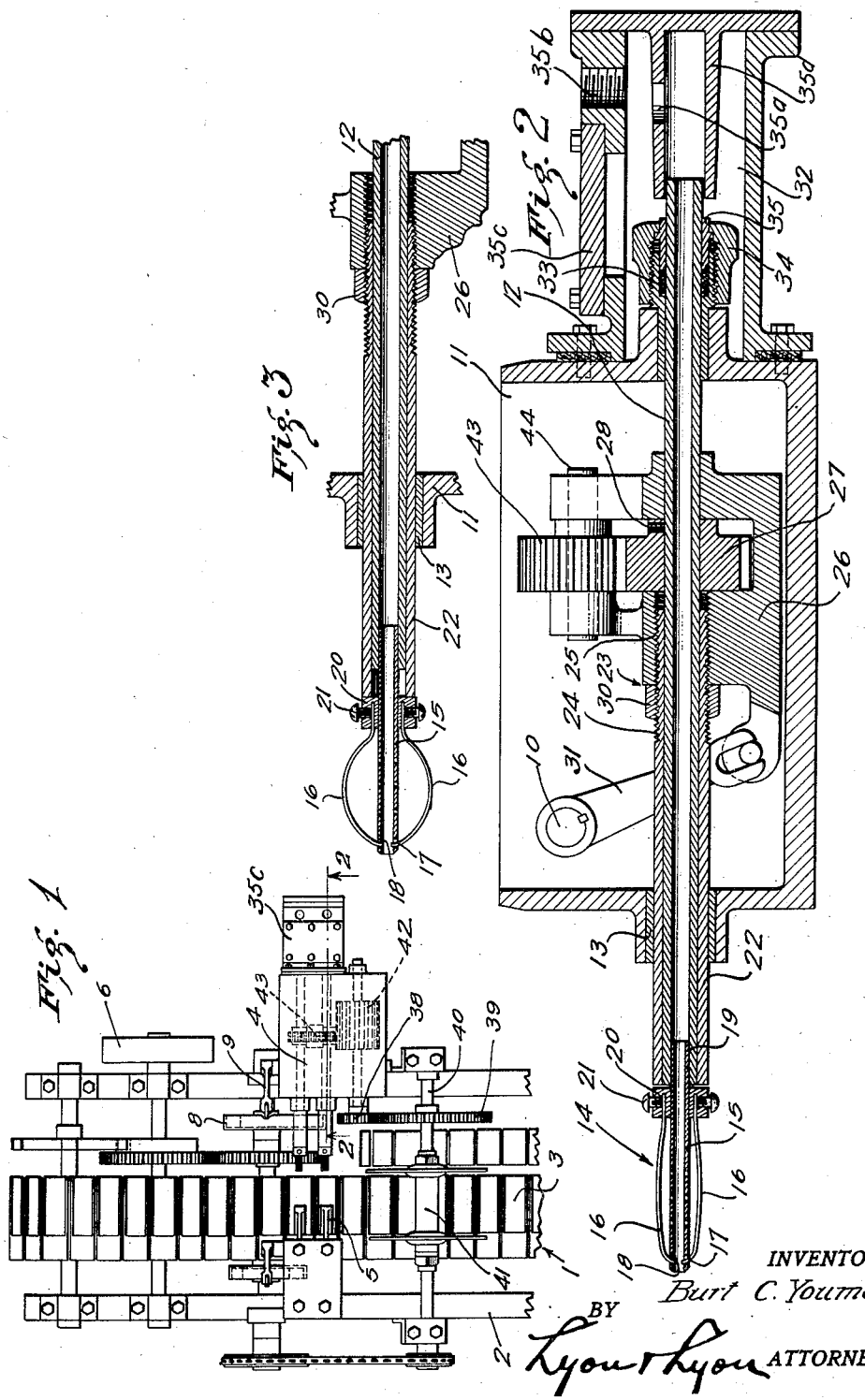

1,853,328

UNITED STATES PATENT OFFICE

BURT C. YOUMAN, OF SAN FRANCISCO, CALIFORNIA, ASSIGNOR TO CALIFORNIA PACKING CORPORATION, OF SAN FRANCISCO, CALIFORNIA, A CORPORATION OF NEW YORK

FISH CLEANING MECHANISM

Application filed March 3, 1930. Serial No. 432,639.

This invention relates to fish cleaning mechanism for use in a type of machine in which the fish's body is presented to the cleaning mechanism in a longitudinally aligned relation, so that the cleaning means can pass longitudinally into the fish's body. The invention particularly concerns the construction of the extractor, or auger, which is carried into the fish's body and which is rotated in such a way that it entangles the viscera of the fish, whereupon the extractor is withdrawn so as to draw the viscera from the fish's body.

The general object of the invention is to provide a viscera extractor of improved construction which can be readily adjusted to control its effectiveness in operating upon fish of different sizes; also to provide improved means for delivering flushing water into the fish's body at the location of the extractor while it is in operation, thereby assisting in the cleaning operation.

A further object of the invention is to provide a rotary fish cleaning device with means for delivering cleaning water into the body of the fish to cooperate with the extractor.

Further objects of the invention will appear hereinafter.

The invention consists in the novel parts and combinations of parts to be described hereinafter, all of which contribute to produce an efficient fish cleaning mechanism.

A preferred embodiment of the invention is described in the following specification, while the broad scope of the invention is pointed out in the appended claims.

In the drawings:

Figure 1 is a plan upon a reduced scale, showing a portion of an automatic fish cleaning machine embodying my invention.

Figure 2 is a longitudinal section upon an enlarged scale, taken about on the line 2—2 of Figure 1, certain parts being omitted, and showing the water box connection to the extractor. This view shows the extractor head in an unexpanded state.

Figure 3 is a fragmentary section similar to Figure 2, certain parts being broken away, and particularly illustrating the way in which the extractor can be adjusted to hold it in an expanded condition.

Referring more particularly to the parts and especially to Figure 1, 1 represents an endless belt mounted in horizontal plane on a suitable frame 2. This belt has a plurality of fish carriers 3 in the form of channel-shaped members in which the body of the fish can lie so that the longitudinal axis of the fish extends transversely to the direction of movement of the belt. This belt is advanced by any suitable mechanism with a step by step movement so as to bring the fish carriers in succession into position in front of the cleaning mechanism 4, at which point the motion of the belt is arrested for a time to permit the fish cleaning mechanism to withdraw the viscera and clean the cavity within the fish.

While this mechanism is operating, the bodies of the fish may be held in the carriers by suitable automatic holders 5. The machine is driven by a suitable belt passing over the belt pulley 6. The mechanism includes a transverse cam shaft 7 that extends transversely with respect to the direction of movement of the belt or conveyor 1, and this shaft carries a cam 8 which controls the operation of the cleaning mechanism through the agency of a rocker arm 9 carried on a rock shaft 10 (see Figure 2).

The cleaning mechanism is supported in a casing or box 11 that forms a part of the fixed frame of the machine.

In applying my invention to a machine of this type, I provide a plurality of extractors which operate as a gang and are mounted so that at each rocking movement of the rock shaft 10 they will be moved forward longitudinally into the bodies of the fish and withdrawn so as to extract the viscera.

This mechanism is constructed so that the extractor or extractors are carried on rotary spindles which are reciprocated automatically so as to advance the extractors into the fish's body and, at the same time, rotate them. The extractor head is constructed in such a way that it will entangle the viscera or engage the same so that on the return movement of the spindle the viscera are withdrawn from the fish.

The invention includes means for delivering rinsing water to the extractor head so that the cavity within the fish is flushed while the extractor head is operating to withdraw the viscera.

In the present embodiment of the invention I have illustrated a multiple extractor mechanism including two extractor spindles located alongside of each other, in which case the conveyor belt would be advanced through a distance corresponding to the width of two fish holders.

In Figure 2 I illustrate the preferred form of the mechanism. Each unit of the mechanism includes a rotary spindle 12 which is preferably of tubular form, with its ends guided to slide and rotate in bushings 13 in the walls of the casing 11. The forward end of this spindle carries an extractor 14 which is in the form of a head constructed in such a way that if rotated in the fish's body it will entangle the viscera. While this head may have various forms, in Figure 2 I have illustrated it as consisting of a centrally disposed tubular body 15 carrying one or more sweeps 16. These sweeps may be of any suitable construction which will enable them to lie at a short distance from the axis of rotation of the body member 15 and are preferably constructed so that they can be more or less expanded or adjusted.

In the present instance the sweeps 16 consist of flat resilient bars the outer ends 17 of which are turned inwardly and engage openings 18 in the end of the body member 15. One end of the body member is secured rigidly at 19 in the forward end of the spindle 12. The rear ends of the sweeps 16 are secured in a collar 20 that can slide freely on the tube 15. They may be removably secured in the collar by means of set screws 21. The sweeps 16 tend naturally to assume a rather flattened bow form, as illustrated in Figure 2.

I provide means for adjusting the position of this collar 20 to hold the sweeps 16 in a more or less expanded condition. (See Figure 3, in which the sweeps are adjusted in a more positive bowed form.) This adjusting means is preferably located remote from the collar 20 and within the casing 11 so that it will remain clean. For this purpose I provide an adjustable sleeve or outer tube 22 which telescopes over the forward end of the spindle 12, and the rear end of this sleeve is provided with any suitable adjusting means 23. This is effected by providing threads 24 on the rear end of the sleeve which are received in a threaded socket 25 which is formed in a reciprocating cross-head 26. This cross-head is slid over the two spindles while held within the casing 11 and each spindle 12 carries a pinion 27 which is secured to it by means of a set screw 28 or any other suitable means. In the operation of the machine, each of the pinions 27 is rotated continuously.

A check-nut 30 may be provided on the threads 24 for locking the sleeve 22 in any adjusted position. The forward end of the sleeve abuts against the collar 20 and moves it relatively outwardly on the body 15, thereby holding the sweeps in a more or less expanded condition.

The cross-head 26 may be reciprocated by an arm 31 carried rigidly by the rock shaft 10.

A suitable connection is made for supplying water to the extractor 14 and this is preferably accomplished by forming the spindle 12 of tubular form, as described, and by providing a water box 32 at the rear end of the spindle, which is secured to the casing 11 and which carries packing 33 held in place by a packing nut 34, and gland 35, for packing each spindle where it passes through the rear wall of the casing. The rear end of the spindle reciprocates in a telescoping sleeve 35 that projects forwardly from the end wall of the water box. The interior of this sleeve is supplied with water through an upper port 35a.

Water is supplied to the water box through a threaded opening 35b and an access opening is provided for the upper side of the box closed by a removable cover 35c.

The machine may have any suitable means for effecting rotation of the two spindles 12. As illustrated in Figure 1, this is accomplished through the medium of a counter-shaft 37 that extends through the casing 11 parallel with the spindle 12 and driven by a pinion 38 meshing with a gear 39 carried on the shaft 40 of the cutter 41 that cuts off the heads and tails of the fish.

This counter-shaft 37 carries a long driving gear 42 which meshes with the adjacent one of the pinions 27 to drive it. A rotary movement is imparted from the driven pinion 27 to the opposite pinion 27 through the medium of an idler 43 carried on the cross-head 26 and mounted on a small shaft 44 located in an intermediate position between the axes of the two spindles 12.

The mode of operation of the mechanism will now be briefly stated.

While the conveyor belt is held stationary and two fish bodies aligned with the axes of the extractor spindles 12, the cam 8 actuates the rock shaft 10 to move the extractors forward. In this way the extractors 14 will be advanced well up into the cavity in the fish's body. At the same time, by reason of their rotation, the extractors will entangle the viscera of the fish so that on the return stroke the fish will become clean. This action of the extractors is enhanced by the spray of rinsing water that is delivered at the extractor head from the water box.

It is understood that the embodiment of the invention described herein is only one of the many embodiments this invention may take, and I do not wish to be limited in the practice of the invention, nor in the claims, to the particular embodiment set forth.

What I claim is:

1. In a fish-cleaning mechanism, the combination of an elongated member, means for reciprocating the same to pass it longitudinally into the fish's body, means at the forward end of said member for engaging the viscera of the fish, means for rotating said member, and means operatively connected with the rear portion of said member for delivering flushing water to the forward end of said member.

2. In a fish-cleaning mechanism, the combination of an elongated tubular member, means for reciprocating the same to pass it longitudinally into the fish's body, an extractor device at the forward end of said member for engaging the viscera of the fish, means for rotating said member, and means operatively connected with the rear portion of said member for delivering flushing water thereto, to flush the interior of the fish.

3. In a fish-cleaning mechanism, the combination of an elongated tubular member, means for reciprocating the same to pass it longitudinally into the fish's body, an extractor device at the forward end of said member for engaging the viscera of the fish, means for rotating said member, and a water box in connection with the rear end of the tubular member and operatively connected to deliver flushing water to the extractor device.

4. A rotary extractor device for withdrawing viscera from a fish's body, having a central body member, and a sweep including a member extending along the side of the body member and operating to entangle the viscera of the fish.

5. A rotary extractor device for withdrawing viscera from a fish's body, having a central body member, a sweep including a member extending along the side of the body member and operating to entangle the viscera of the fish, and means for adjusting the sweep to hold it more or less outwardly from the axis of the body member.

6. A rotary extractor for withdrawing the viscera from a fish's body, having a central body member, a collar mounted on the body member, and a plurality of sweeps attached at one end to the collar and at the other end to the body member and disposed alongside of the body member so as to entangle the viscera when the extractor is rotated on its central axis.

7. A rotary extractor for withdrawing the viscera from a fish's body, having an elongated central body member, a collar mounted on the said body member, and a plurality of flexible sweeps in the form of bows attached at one end to the collar, said body member having means for engaging the outer ends of the sweeps.

8. A rotary extractor for withdrawing the viscera from a fish's body, having an elongated central body member, a collar mounted on the said body member, and a plurality of flexible sweeps in the form of bows attached at one end to the collar, said body member having means for engaging the outer ends of the sweeps, and means for adjusting the position of the collar on the body member to expand or contract the sweeps.

9. A rotary extractor for withdrawing the viscera from a fish's body, having a central tubular body member, a collar mounted to move on the said body member, a plurality of sweeps in the form of flexible bows attached at one end to the collar, said body member having means at its outer end for engaging said sweeps, and means for adjusting the collar along the body member, said extractor having means for delivering flushing water adjacent said sweeps.

Signed at San Francisco, California, this 22nd day of January, 1930.

BURT C. YOUMAN.